US009081854B2

(12) United States Patent
Ulanov et al.

(10) Patent No.: US 9,081,854 B2
(45) Date of Patent: Jul. 14, 2015

(54) MULTILABEL CLASSIFICATION BY A HIERARCHY

(75) Inventors: Alexander Ulanov, St. Petersburg (RU); German Sapozhnikov, St. Petersburg (RU); Georgy Shevlyakov, St. Petersburg (RU)

(73) Assignee: Hewlett-Packard Development Company, L.P., Houston, TX (US)

( * ) Notice: Subject to any disclaimer, the term of this patent is extended or adjusted under 35 U.S.C. 154(b) by 404 days.

(21) Appl. No.: 13/543,783

(22) Filed: Jul. 6, 2012

(65) Prior Publication Data

US 2014/0012849 A1 Jan. 9, 2014

(51) Int. Cl.
*G06F 17/30* (2006.01)

(52) U.S. Cl.
CPC ...... *G06F 17/30707* (2013.01); *G06F 17/3071* (2013.01); *G06F 17/30598* (2013.01); *G06F 17/30705* (2013.01)

(58) Field of Classification Search
None
See application file for complete search history.

(56) References Cited

U.S. PATENT DOCUMENTS

| | | | |
|---|---|---|---|
| 5,717,914 A * | 2/1998 | Husick et al. | 1/1 |
| 6,241,686 B1 * | 6/2001 | Balkin et al. | 600/544 |
| 7,139,754 B2 | 11/2006 | Goutte et al. | |
| 7,756,799 B2 | 7/2010 | Kirshenbaum et al. | |
| 8,041,699 B2 * | 10/2011 | Sacco | 707/705 |
| 2003/0109951 A1 * | 6/2003 | Hsiung et al. | 700/108 |
| 2004/0193019 A1 * | 9/2004 | Wei | 600/300 |
| 2005/0187892 A1 * | 8/2005 | Goutte et al. | 707/1 |
| 2007/0250461 A1 * | 10/2007 | Sabe et al. | 706/12 |
| 2008/0103751 A1 * | 5/2008 | Hsiung et al. | 703/20 |
| 2009/0118132 A1 * | 5/2009 | Haferlach et al. | 506/8 |
| 2009/0318802 A1 * | 12/2009 | Boyden et al. | 600/437 |
| 2010/0161652 A1 | 6/2010 | Bellare et al. | |
| 2011/0053167 A1 * | 3/2011 | Holvoet et al. | 435/6 |
| 2011/0217297 A1 * | 9/2011 | Kao et al. | 424/133.1 |
| 2012/0317593 A1 * | 12/2012 | Myslinski | 725/14 |

FOREIGN PATENT DOCUMENTS

WO WO-0248911 6/2002

OTHER PUBLICATIONS

Bi, Wei, "Muiti-Labei Classification on Tree-and DAG-Structured Hierarehies".

* cited by examiner

*Primary Examiner* — Dung K Chau
(74) *Attorney, Agent, or Firm* — Hewlett-Packard Patent Department

(57) ABSTRACT

A technique of extracting hierarchies for multilabel classification. The technique can process a plurality of labels related to a plurality of documents, using a clustering process, to cluster the labels into plurality of clusterings representing a plurality of classes. The technique classifies the documents and predicts a plurality of performance characteristics, respectively, for the plurality of clusterings. The technique selects at least one of the clusterings using information from the performance characteristics and adds the selected clustering into a resulting hierarchy.

15 Claims, 16 Drawing Sheets

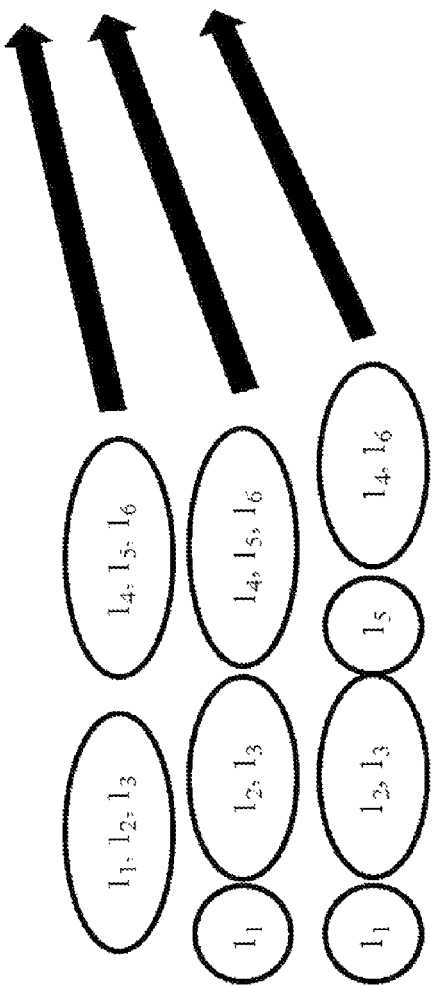
Example: Measure is Accuracy
To predict how good this partition is
Accuracy of the classification on this clusters is 0.93
FIG. 4

Algorithm 1 The PHOCS algorithm for hierarchy building

1: function HIERARCHY(*TrainSet, Labels, RootNode*)
2:     $Pmin \leftarrow PerformanceMeasure(TrainSet)$
3:     for $i \leftarrow Kmin, Kmax$ do
4:         $C[i] \leftarrow doClustering(TrainSet, Labels, i)$
5:         $DataSet \leftarrow dataMetaLabeling(TrainSet, C)$
6:         $Results[i] \leftarrow PerfMeasure(DataSet)$
7:     end for
8:     $PerfPredict, Kbest \leftarrow Predict(Results, C)$
9:     if $PerfPrediction > Pmin$ then
10:         $addChildNodes(RootNode, C[Kbest])$
11:         for $i \leftarrow 0, BestNumber$ do
12:             $Hierarchy(TrainSet,$
13:             $C[KBest][i], RootNode.Child(i))$
14:         end for
15:     end if
16: end function
17: function PERFMEASURE(*DataSet*)
18:     $TrainPart, TestPart \leftarrow split(DataSet)$
19:     return $Performance(TrainPart, TestPart)$
20: end function

FIG. 8A

21: function PERFPREDICT(*Results, Clusters*)
22:     $p[Kmin : Kmax] \leftarrow Results[Kmin : Kmax]$
23:     $p[Kmax + 1 : numOfLabels] = 0$
24:     for $i \leftarrow Kmax + 1, numOfLabels$ do
25:         for $j \leftarrow 2, i$ do
26:             for $k \leftarrow 2, i$ do
27:                 $p[i] \leftarrow Max(p[i], p[k] * p[j])$
28:             end for
29:         end for
30:     end for
31:     for $i \leftarrow Kmin, Kmax$ do
32:         $p[i] \leftarrow Result[i] * maxClusterSize[i]$
33:     end for
34:     return $max(p), indexOfMax(p)$
35: end function

FIG. 8B

Table I
MULTILABEL DATASETS AND THEIR STATISTICS

| Name | Examples | Labels | Bound of Labelsets | Actual Labelsets | Labelset Diversity |
|---|---|---|---|---|---|
| Medical | 978 | 45 | 978 | 94 | 10% |
| Enron | 1702 | 53 | 1702 | 753 | 44% |
| Mediamill | 43907 | 101 | 43907 | 6555 | 15% |
| Bibtex | 7395 | 159 | 7395 | 2856 | 39% |

FIG. 10

Table II
MEASURES OF CLASSIFICATION FOR THE MEDIAMILL DATASETS:
F1-MEASURE, P - PRECISION, R - RECALL

| Hierarchy | MICRO All Labels | | | MICRO Leaf Labels | | | MACRO Leaf Labels | | |
|---|---|---|---|---|---|---|---|---|---|
| | F1 | P | R | F1 | P | R | F1 | P | R |
| Flat | .54 | .66 | .45 | .54 | .66 | .45 | .10 | .24 | .08 |
| H1 | .62 | .65 | .58 | .53 | .58 | .50 | .13 | .19 | .11 |
| H2 | .62 | .65 | .58 | .53 | .58 | .50 | .13 | .19 | .11 |

FIG. 11

Table III
MEASURES OF CLASSIFICATION FOR THE BIBTEX DATASETS

| Hierarchy | MICRO All Labels | | | MICRO Leaf Labels | | | MACRO Leaf Labels | | |
|---|---|---|---|---|---|---|---|---|---|
| | F1 | P | R | F1 | P | R | F1 | P | R |
| Flat | .31 | .81 | .19 | .31 | .81 | .19 | .14 | .40 | .11 |
| H1 | .61 | .73 | .52 | .37 | .61 | .21 | .22 | .38 | .18 |
| H2 | .57 | .66 | .50 | .38 | .60 | .27 | .22 | .40 | .18 |

FIG. 12

Table IV
MEASURES OF CLASSIFICATION FOR THE MEDICAL DATASETS

| Hierarchy | MICRO All Labels | | | MICRO Leaf Labels | | | MACRO Leaf Labels | | |
|---|---|---|---|---|---|---|---|---|---|
| | F1 | P | R | F1 | P | R | F1 | P | R |
| Flat | .80 | .85 | .75 | .80 | .85 | .75 | .26 | .32 | .25 |
| H1 | .88 | .91 | .86 | .82 | .84 | .81 | .30 | .33 | .30 |
| H2 | .88 | .91 | .86 | .82 | .84 | .81 | .30 | .33 | .30 |

FIG. 13

Table V
MEASURES OF CLASSIFICATION FOR THE ENRON DATASETS

| Hierarchy | MICRO All Labels | | | MICRO Leaf Labels | | | MACRO Leaf Labels | | |
|---|---|---|---|---|---|---|---|---|---|
| | F1 | P | R | F1 | P | R | F1 | P | R |
| Flat | .46 | .66 | .35 | .46 | .66 | .35 | .09 | .13 | .08 |
| H1 | .62 | .64 | .61 | .50 | .62 | .42 | .10 | .15 | .09 |
| H2 | .62 | .64 | .60 | .46 | .59 | .38 | .10 | .15 | .08 |

FIG. 14

MULTILABEL CLASSIFICATION BY A HIERARCHY

BACKGROUND OF THE DISCLOSURE

Information processing has progressed. Information processing includes computer aided techniques. As an example, information processing includes "text mining." Typical text mining tasks include text categorization, text clustering, concept/entity extraction, production of granular taxonomies, sentiment analysis, document summarization, and entity relation modeling (i.e., learning relations between named entities). Classification techniques are also included in text mining. As an example, classification techniques are often general and have many diverse applications. Such classification techniques may be applied to text processing, document processing, computer vision, medical and biological sciences, among others. A goal of text classification is to assign an electronic document to one or more categories based on its contents.

BRIEF DESCRIPTION OF THE DRAWINGS

FIG. 4 is a simplified flow diagram of a method for filling a table with a plurality of performance results according to an example of the present disclosure.

FIGS. 7 through 14 are illustrations of diagrams and experimental results according to examples of the present disclosure.

DETAILED DESCRIPTION OF SPECIFIC EMBODIMENTS OF THE DISCLOSURE

Figure 1:
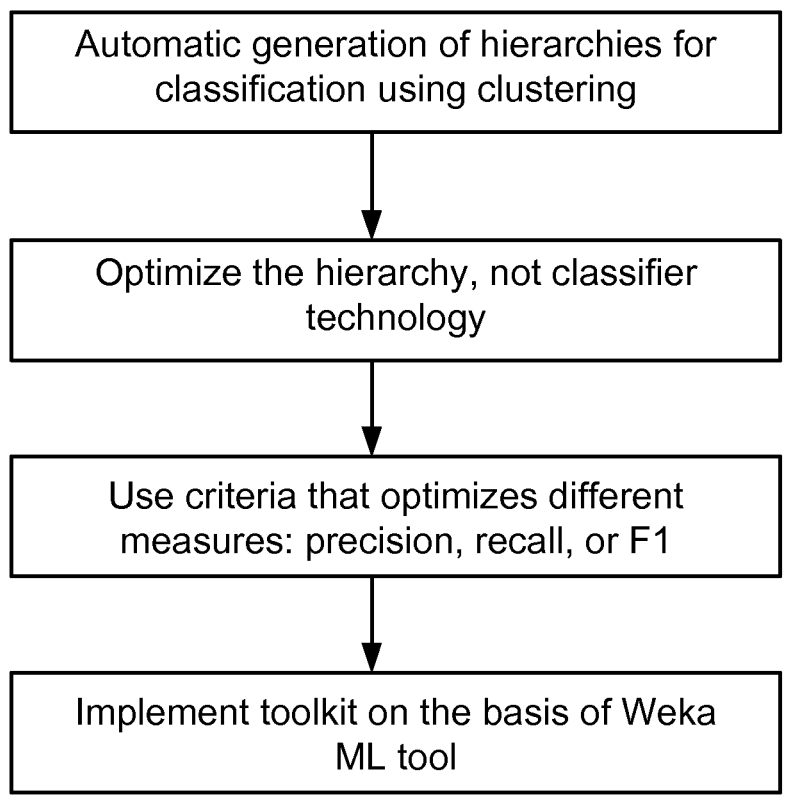
FIG. 1 is a simplified diagram of elements of an example of the present disclosure.

According to the present disclosure, information-processing techniques are provided. More particularly, the present disclosure provides a method and system for processing a plurality of documents including labels using hierarchical classification. Merely by way of example, the present method and system may be used with large-scale volumes of electronic documents including labels. As used herein, the term "document(s)" shall be interpreted by ordinary meaning. In other implementations, methods described herein can include other variations, modifications, and alternatives.

In an example, the present method and system provide for automatically extracting hierarchies for classification from a plurality of documents including labels. In an example, the method and system is classifier independent, which enhances accuracy of multi-label classification optimizing a hierarchy structure, not classifiers. The present method is intended for datasets, which do not include predefined hierarchies in examples. Further details of the present method and system can be found below.

In an example, the present disclosure provides for a method and system for a hierarchical classification, which is desirable. In flat classification, the number of training examples associated with each label is considerably less than the total number of examples. The computational complexity of training a multi-label classifier is strongly affected by the number of labels. Each classifier in a hierarchy deals with a much smaller set of labels as compared to a full set of labels. In some examples, datasets already have hierarchy, however, the present method and system processes documents having labels that do not have hierarchy or hierarchies.

As an example, large-scale multi-label products are provided. An example of such products includes the World Intellectual Property Organization (WIPO) IPC (International Patent Classification). As an example, the products include a number of documents having several tens of labels and several hundreds of documents, which are impossible or often cumbersome to process with conventional techniques. Other examples may include documents from LexisNexis®, among others.

The present method and system can be used to increase performance of large-scale multi-label classification of a plurality of documents. As an example, the present method and system configures a large-scale multi-label classification task with a large set of labels into a tree-shaped hierarchy of simpler multi-label classification tasks, which is more efficient and manageable.

In an example, the method processes information from a plurality of documents. The method includes providing a plurality documents under control of a processing device. Each of the plurality of documents has a label or labels. The method includes processing at least the plurality of labels, using at least a clustering process, to cluster the labels into plurality of clusterings representing a plurality of classes, respectively. The method includes classifying the documents using the set of labels as classes and predicting a plurality of performance characteristics, respectively, for the plurality of clusterings. The method also includes selecting at least one of the clusterings using information from the performance characteristics and adding the selected clustering into a resulting hierarchy. In this example, the method iteratively repeats the processing, classifying, predicting, selecting, and adding until a condition is achieved.

As shown, the present method and apparatus can include one or more of the benefits and/or advantages. Depending upon the example, there can be other variations, modifications, and alternatives. Further details of the present method and apparatus can be found throughout the present specification and more particularly below.

A detailed method according to examples of the present disclosure may be outlined as follows:

1. Provide a plurality documents, each of the documents including a label(s);
2. Store the plurality of documents having the labels in electronic form in one or more mass data storage devices;
3. Determine two (2) integer value representing a number of clusters;
4. Input two (2) integer values into a clustering process and associated computer codes under control of a processor;
5. Process at least the labels related to the documents, using at least a clustering process such as a K-means algorithm, to cluster the labels into plurality of respective different clusterings;

6. Repeat step 5 from a minimum integer value to a maximum integer value;

7. Classify the documents using the set of labels as classes according to the clusters and repeat step 7 for each of the integer values;

8. Predict a performance characteristic for each clustering. That is, performance is measured for any and all possible hierarchy topologies or a selected number of topologies In an example, the method provides a performance measure to predict (i.e., measure) how good, i.e., accurate, the clustering for classification is at a given layer. Performance is measured for all possible hierarchy topologies using the results for the given layer and then the best one (most accurate) is selected. Each prediction of the performance characteristics for each topology depends on the performance measure for the current layer and the number of labels still needed to be clustered (maximal size of cluster in current clustering). The present method predicts a best estimate of the performance measure for the next layer of the hierarchy given all possible topologies. The best estimate may be estimated by considering true positives ("TP"), false negatives ("FN"), and false positives ("FP"), and then by computing the performance measure. TP decreases and FN increases deeper into a hierarchy. When the performance measure becomes smaller layer-by-layer (as a hierarchy is growing), that is, the performance measure at layer k is larger than at the layer k+1, and the relative decrease depends on the number of clusters. So to estimate performance measure at layer k+1, performance measures on layers are multiplied from 1 to k.

As an example, the performance measures can relate to accuracy, recall, and other parameters. If the performance measure relates to the accuracy or recall of classification, assuming the errors at different layers to be independent of each other, then the accuracy of classification at the k+1 layer would be found by multiplying the accuracies of all the previous layers. Thus, the final prediction for each partition depends both on the decrease of the performance measure at the given layer and on the number of labels yet to be clustered, that is, on the size of the maximal cluster or, in other words, the maximal depth of the hierarchy. The final prediction can be found by multiplying performance measure of clustering on current layer with the prediction for the maximal cluster.

9. Select at least one of the clusterings using information from the performance characteristics. That is, each clustering has a performance characteristic that shows a prediction of performance of this clustering for classification. The method selects the clustering with the highest performance characteristic.

10. Add the selected clustering into a resulting hierarchy (i.e., that is, create a meta-label from labels of the selected clustering); and add the meta-label to a node of the resulting hierarchy. In particular, the method forms the metalabel from labels in one cluster. For each cluster, the method forms a metalabel (if size is more than 1). Note: At the beginning, the current node is the root node. The root node consists of all labels. If the clustering consists of only 1 label, the method does not create a metalabel, rather, the method adds the label as a child node to the current node to define a leaf. The method does not occur recursively for the leaves.

11. Repeat processing, classifying, predicting, selecting, and adding until each cluster consists of a single label in an iterative manner. That is, the method occurs recursively from initialization of the steps above. Each metalabel is provided in the resulting hierarchy. The metalabel is set as the current node. Labels from the metalabel are used as the current set of labels. If the document from the original dataset has at least one label from the current set, the document is used in the current dataset. For each step in the method, only labels from current node and only documents with these labels are used.

12. Perform other steps, as desired.

The above sequence of steps relates to a method for hierarchical classification according to this example of the present disclosure. As shown, the hierarchical classification process, which is provided with documents having labels, provides for predicting a desirable hierarchy for the classifications. Depending upon the example, certain steps may be added, removed, or modified. Further details of the present method can be found by way of the examples below.

In the present example, the method and system provides hierarchical multi-label classification. If the number of categories for each document in classification task is more than one, the method and system processes multi-label classification. Some documents may have only one category. In an example, classes may have a hierarchical structure, which can be used for classification. On each layer, the present method and system uses a classifier to assign a document to one or more labels. Each classifier may process a smaller number of labels in this example.

FIG. 1 is a simplified diagram of elements of an example of the present disclosure. In the present example, the method and system includes a predictive process for extracting prospective hierarchies. In this example, the following features are included:

1. Automatic generation of hierarchies for classification using clustering;

2. Optimize the hierarchy, not classifier technology;

3. Use criteria that optimizes (i.e., finds the best fit or most desirable) different measures: precision, recall, or F1 (i.e., a measure of a test(s) accuracy often including precision and recall); and 4. Toolkit implemented on the basis of Weka (Waikato Environment for Knowledge Analysis) ML tool Of course, there can be other variations and alternatives.

Figure 2:
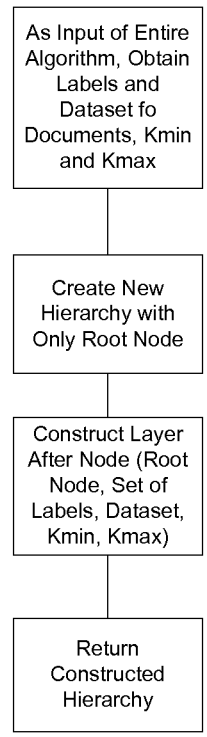
FIG. 2 is a simplified flow diagram of a method of creating a hierarchy with a root node and an initial process according to an example of the present disclosure.

FIG. 2 is a simplified flow diagram of a method of creating a hierarchy with a root node and an initial process according to an example of the present disclosure.

Figure 3A:
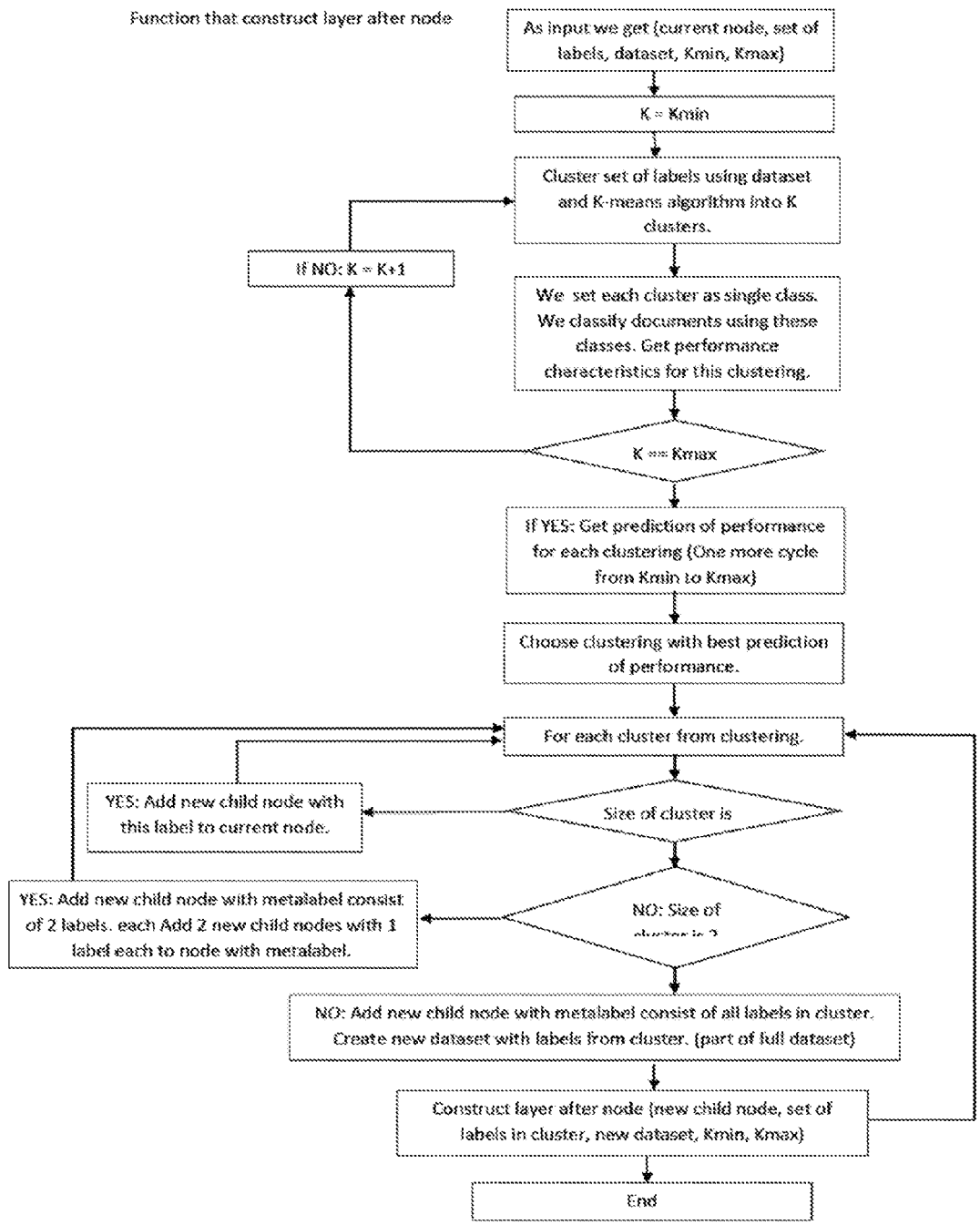
FIG. 3A is a simplified flow diagram of a function that constructs a layer after a node for predicting which partition is most desirable according to an example of the present disclosure.

FIG. 3A is a simplified flow diagram of a function that constructs a layer after a node for predicting which partition is most desirable according to an example of the present disclosure.

Figure 3B:
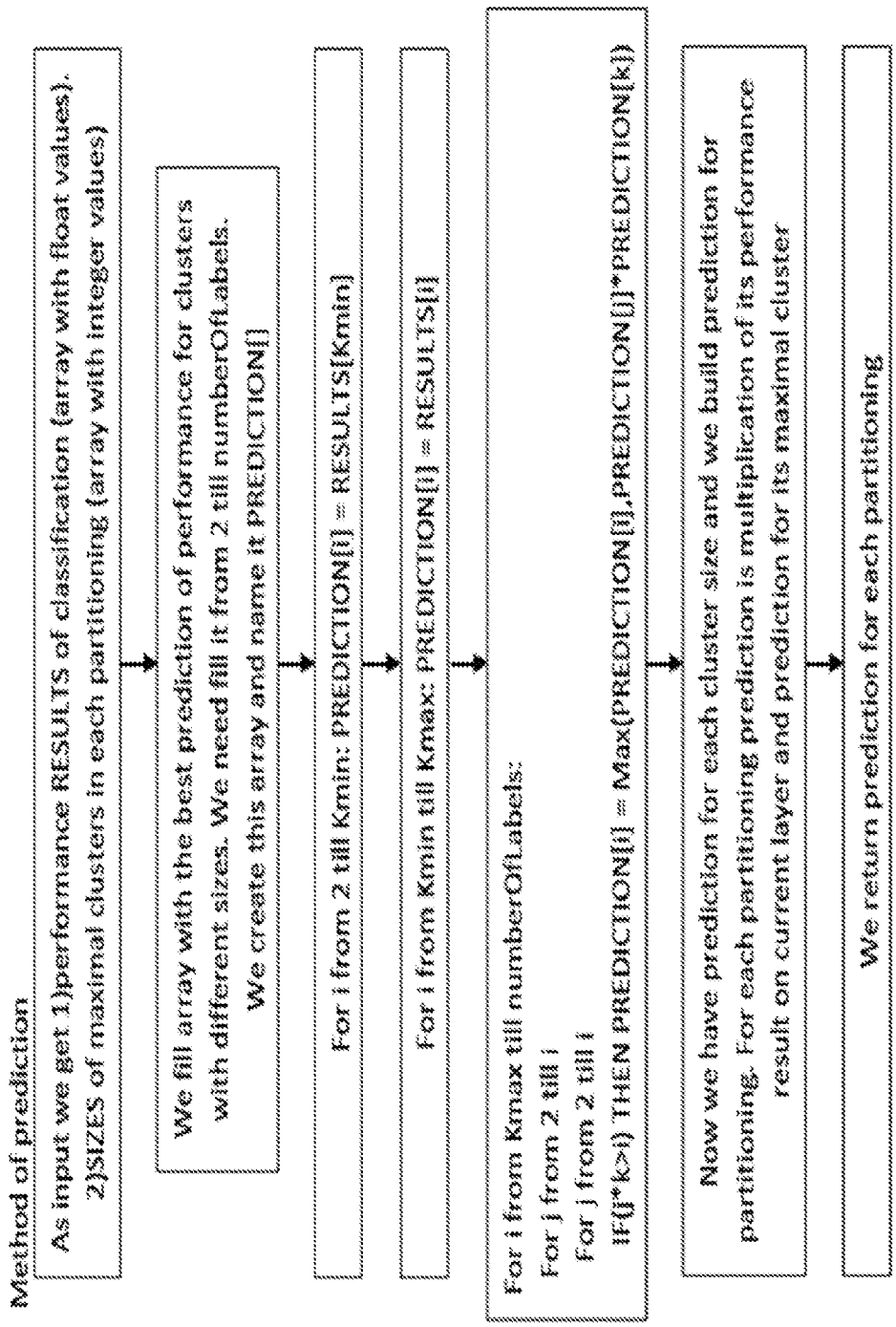
FIG. 3B is a simplified flow diagram of a method for processing a plurality of partitions according to an example of the present disclosure.

FIG. 3B is a simplified flow diagram of a method for processing partitions according to an example of the present disclosure.

In this example, the present method (and related system) uses a top-down approach for building taxonomies. The method provides for number of labels for a plurality of documents. The method includes clustering on different number of clusters. The method then predicts, which partition is the best for classification, taking into account for further clustering of the classifications. The method is recursive for clusters, which have a size more than 2. As an example, a cluster of size 1 is an initial leaf of a resulting hierarchy. A cluster of size 2 will be separated to two clusters in this example.

FIG. 4 is a simplified flow diagram of a method for filling a table with performance results according to an example of the present disclosure. In this example, the method predicts, which partition will be the best for classification, taking into account a present result with the knowledge that a number of additional layers will be built. In this example, the method provides classification, using clusters as meta-labels. As a result, the method achieves performance measure that shows a desirability of the particular partition.

Figure 5:
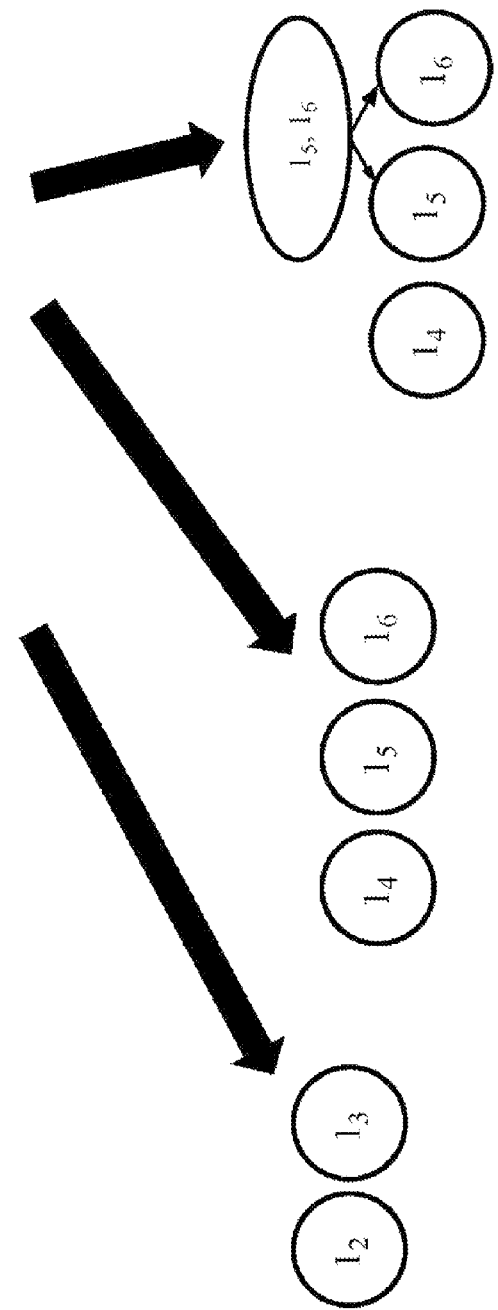
FIG. 5 is a simplified flow diagram of a method for predicting a desirable partition for classification according to an alternative example of the present disclosure.

FIG. 5 is a simplified flow diagram of a method for predicting a desirable partition for classification according to an alternative example of the present disclosure. In this example, the method predicts, which partition will be the best for classification, taking into account a present result with the knowledge that a number of additional layers will be built. In this example, the method also determines any and all possible partitions of a cluster and computes the prediction of their respective performance. As shown is an example of a measure of accuracy. The method predicts a desirable partition for classification as further described as follows, referring again to FIG. 5. As used herein, the "I" refers to each cluster numbered from 2-6:

Predict Accuracy for $\{I_2, I_3\}$ and $\{I_4, I_5, I_6\}$; I=clusters
Believe that for $\{I_2, I_3\}$ it will be the same as in the table;
For $\{I_4, I_5, I_6\}$ prediction can be three (3) classes into (3) clusters; three (3) classes are divided in two (2) clusters, size of one will be 2. The higher value will be selected.

Further details are described in the Figure.

Figure 6:
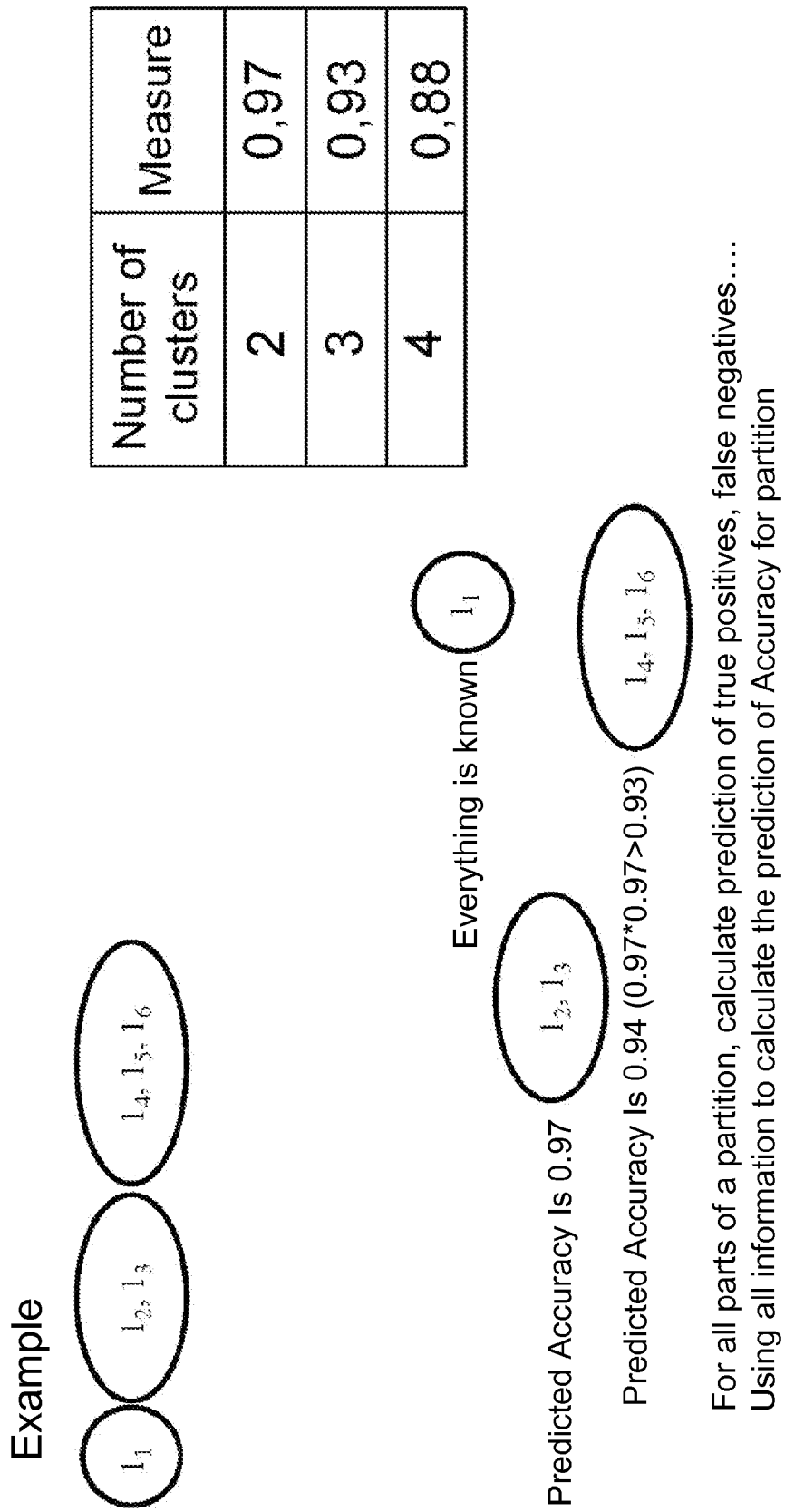
FIG. 6 is a simplified flow diagram of a method for predicting a desirable partition for classification according to an alternative example of the present disclosure.

FIG. 6 is a simplified flow diagram of a method for predicting a desirable partition for classification according to an alternative example of the present disclosure. In this example, the method predicts which partition is the best for classification, taking into account a present result with the knowledge that a number of additional layers will be built.

In this example, the present method can be implemented using a computing system coupled to a network of computers. Among other features, the system includes a wide area network of computers such as, for example, the Internet. The network of computers includes workstations or computer terminals, which can be IBM compatible personal computers (i.e., PCs), workstations, network computers (i.e., NCs), remote computing devices, television sets, set-top boxes or other computer-like devices. These computers are coupled through lines to the Internet, which includes a variety of servers and other computers. As merely an example, one of the servers is shown as server.

Server is coupled to the Internet through line, which can be through an internet service provider, which is commonly known as an ISP. Server often includes sufficient memory to store information such as documents and/or electronic files and the like. The memory can also store computer codes and/or source codes executing the methods herein. The memory can be based on a hard drive, a floppy drive, tape, or other storage media. Of course, the type of memory used depends upon the application.

In this example, the system includes a monitor, a computing system, a user input device, a network interface, and a keyboard. Computing system preferably includes familiar components such as a processor, and memory storage devices, such as a random access memory (RAM), a fixed disk drive, and a system bus interconnecting the above components. User input device may include a mouse, a trackball, a keyboard, a keypad, a joystick, a digitizing tablet, a wireless controller, a microphone, or other input devices.

The RAM and fixed disk drive are mere examples of tangible media for storage of computer programs, electronic information files with labels, audio and/or video data, and code implementing examples of the present disclosure. Other types of tangible media include SRAM, floppy disks, optical storage media such as CD-ROMs and bar codes, semiconductor memories such as flash memories, stick memories read-only-memories (ROMs), ASICs, battery-backed volatile memories, and the like.

The system may also include network interface, which may be any type of interface to a computer network. For example network interface may be a WiFi, cable, DSL, telephone modem, an Ethernet or fast Ethernet interface, or the like. As disclosed above, the computer network may be any type of network such as the Internet, an Intranet, an IPX network, private tunnel, local area network (LAN), WAN, and the like. In an example, computing system includes a microprocessor, microcontroller, or other processing device, which uses an operating system from Microsoft Corporation of Redmond, Wash., BeOS, LINUX, or the like. Many other systems, such as MacOS™ from Apple Corporation or Solaris™ from Sun Microsystems (now Oracle Corporation) or UNIX running upon a SPARCstation, and the like can also be used.

In a specific example, the present disclosure includes system for processing information, which includes a computer readable memory coupled to a processing device. The system includes a mass data storage device comprising a plurality documents having respective a plurality of labels under control of a processing device. The plurality of documents are stored in electronic form. The mass data storage device is coupled to a computing device, which is has a computer readable memory. The system a user interface configured for inputting through the user interface an integer value representing a number of clusters into a clustering process under control of the processing device. The integer value ranges from a minimum number to a maximum number, whereupon the minimum number is two (2) and greater and the maximum number is an integer greater than the minimum number. The system includes readable memory including a first computer code directed to processing at least the labels related to the documents, using at least a clustering process, to cluster the labels into plurality of respective clusterings representing a plurality of respective classes. The memory also includes a second computer code directed to classifying the documents using the set of labels as classes and a third computer code directed to predicting a plurality of performance characteristics, respectively, for the plurality of clusterings. The memory also includes a fourth computer code directed to selecting at least one of the clusterings using information from the performance characteristics and a fifth computer code directed to adding the selected clustering into a resulting hierarchy.

In an alternative example, a computer application is provided. The computer application is capable of being stored on a computer readable memory device. The application includes a first computer code directed to processing at least the labels related to the documents, using at least a clustering process, to cluster the labels into a plurality of clusterings representing a plurality of classes. A second computer code is directed to classifying documents using the set of labels as classes. A third computer code is directed to predicting a plurality of performance characteristics, respectively, for the plurality of clusterings. A fourth computer code is directed to selecting at least one of the clusterings using information from the performance characteristics and a fifth computer code directed to adding the selected clustering into a resulting hierarchy.

The system above discloses examples of configurations that embody the present disclosure. It will be readily apparent to one of ordinary skill in the art that many system types, configurations, and combinations of the above devices are suitable for use in light of the present disclosure. Of course, the types of system elements used depend highly upon the application.

EXAMPLES

To prove the principle and operation of the present disclosure, experiments have been performed. These experiments are merely examples, which should not unduly limit the scope of the claims. Details of the present example can be found in "Enhancing Accuracy of Multilabel Classification by Extracting Hierarchies," in the names of Alexander Ulanov, German Sapozhnikov, Nikolay Lyubomishchenko, Vladimir Polutin, Georgy Shevlyakov. Enhancing Accuracy of Multi-label Classification by Extracting Hierarchies from Flat Clusterings. DEXA workshop: 8th International Workshop on Text-based Information Retrieval (TIR-11) Aug. 31, 2011, which is incorporated by reference herein. As an example, single-label classification deals with a set of documents associated with a single label (class) Lambda from a set of disjoint labels L, |L|>1. To solve this problem, tools are used, for instance, the Naive Bayes and Support Vector Machine classifiers. If |L| is equal to or greater than two (2), then the learning problem belongs to multilabel classification.

In some classification problems, labels are associated with a hierarchical structure, and in this case the task resides in the area of hierarchical classification. That is, the labels include information (i.e., as metadata, tables) that explicitly and/or implicitly leads to the hierarchical structure. If each document corresponds to more than one node of a hierarchical structure, then hierarchical multilabel classification is used instead of flat (non-hierarchical) multilabel classification.

Methods of multilabel classification can generally be divided into the following: problem transformation methods and algorithm adaptation methods. Certain problem transformation methods are the methods transforming a multilabel classification problem into a single-label one, for the solution of which any classifier can be used. A desirable property of problem transformation methods is that they are algorithm independent. Algorithm adaptation methods are the methods that extend specific learning algorithms to handle-multilabel data directly.

If labels have a hierarchical structure, both hierarchical and flat classification algorithms can be used. However, in hierarchical classification, a hierarchy of classifiers can be built with the help of a label hierarchy. In an example, a hierarchical classification may perform better than a flat one. First, with hierarchical classification, the present method solves the problem similar to that of the class imbalance effect typical for single-label classification. Second, computational complexity of training a multilabel Classifier depends on the number of labels. Besides simple algorithms (e.g., binary relevance) with linear complexity with respect to |L|, there are also more advanced methods having higher complexity. Computational complexity of hierarchical classification is improved along with the linear training and logarithmic testing complexity with respect to |L|.

In this example, the present method and system provides for extracting hierarchies with the maximal F-measure for improving multilabel classification accuracy. As an example, the algorithm is called the PHOCS (Predicted Hierarchy Of ClassifierS). A feature of the present method and system is to enhance the accuracy of classification by transforming an original flat multilabel classification task with a large set of labels L into a tree-shaped hierarchy of simpler multilabel classification tasks. This example performs the following: (1) automatic generation of hierarchies for classification through flat clustering; (2) use of certain criteria optimizing the F-measure for predicting and extracting prospective hierarchies; (3) implementation of the corresponding toolkit on the basis of the WEKA ML tools.

In text classification, most of the studies deal with flat classification, when it is assumed that there are no relationships between categories. Hierarchical classification is generally represented by two methods, namely, the big-bang approach and the top-down level-based approach. In the big-bang approach, a document is assigned to a class in one single step, whereas in the top-down level-based approach, classification is performed with classifiers built at each level of a hierarchy.

In the top-down level-based approach, a classification problem is decomposed into a smaller set of problems corresponding to hierarchical splits in a tree. Each of these sub-problems can be solved much more accurately. Moreover, a greater accuracy is possible to achieve because classifiers can identify and ignore commonalities between subtopics of a specific class, and concentrate on those features that distinguish them. This approach is used by most hierarchical classification methods due to its simplicity. They utilize a well-known hierarchical (taxonomy) structure built by experts. In the top-down level-based approach, the classification method firstly determines whether a document belongs to the category tree, i.e., the category tree at the root level. If so, the method further determines if the document belongs to one or more sub-trees at the next level. The process is repeated until the document cannot be further classified into any sub-tree or it reaches the leaf categories. This approach is used by most hierarchical classification methods due to its simplicity.

A limitation with the top-down approach is that misclassification at a higher level of a hierarchy may force a document to be wrongly routed before it can be classified at a lower level. Another limitation is that sometimes there is no pre-defined hierarchy and one has first to build it. It is usually built from data or from data labels. In this example, the present method and system overcomes these limitations, which seems less complex from computational point of view, since the number of labels is usually less than the number of data attributes.

The present method and system includes a top-down level based approach utilizing the hierarchical topic structure to decompose the problem of classification into a sequence of simpler problems. The relative performance of the flat classifier and the hierarchical classifiers is compared on the same set of test documents. It is shown that the use of hierarchy for text classification results in a significant improvement of accuracy of classification: from 45% for a flat classifier to 71% for a hierarchical classifier.

There exist approaches employing linear discriminant projection of categories for creating hierarchies based on their similarities. They show that classification performance in this case is better as compared to the case with a flat one. There is also a range of methods aimed to reduce the complexity of training flat classifiers. Usually they partition data into two parts and create a two-level hierarchy.

The HOMER method constructs a Hierarchy Of Multi-label classifiERs, i.e., HOMER. Each of them deals with a much smaller set of labels with respect to |L|, and with a more balanced example distribution. This leads to an improved predictive performance as well as to linear training and logarithmic testing complexity with respect to |L|. At the first step, the HOMER automatically organizes labels into a tree-shaped hierarchy. This is accomplished by recursively partitioning a set of labels into a number of nodes using the balanced clustering algorithm. Then it builds one multilabel classifier at each node apart from the leaves. (In the PHOCS, present method and system use the same concept of hierarchy and metalabels.)

Other techniques introduce the RAkEL classifier (RAndom k labELsets, k is the parameter specifying the size of labelsets) that outperforms some multilabel classifiers. According to the present method and system, datasets are used with predefined hierarchies trying to predict, not to construct a hierarchy, which is desirable for classification.

In this example, the present technique uses the divide-and-conquer paradigm for the algorithm design. The main idea is transformation of a multilabel classification task with a large set of labels L into a tree-shaped hierarchy of simpler multi-label classification tasks, when each of them will deal with a small number k of labels: k<<|L| (sometimes k<|L|).

Figure 7:
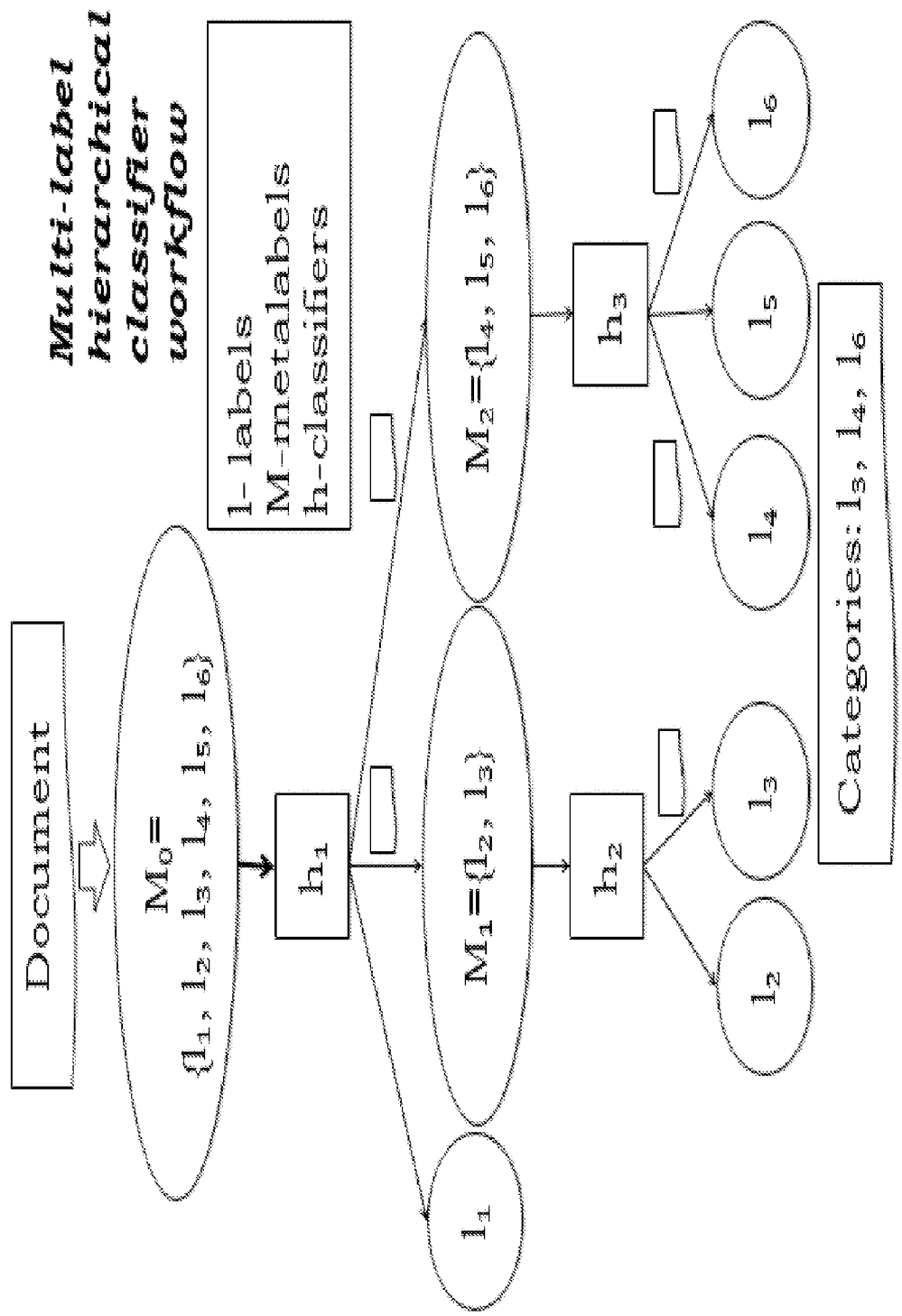

Each node n of this tree contains a set of labels $L_n$ is a subset of L. FIG. 7 illustrates a simplified diagram with six (6) leaves and three (3) internal nodes. There are |L| leaves, each containing a singleton (a single element set) {$l_j$} with a different label j of L. Each internal node n contains a union of the label sets of its children: $L_n$=ULc, c family children (n). The root accommodates all the labels: $L_{root}$=L.

In this example, metalabel Mn of a node n is defined as disjunction of the labels associated with that node: Mn V lj, lj family Ln. Metalabels have the following semantics: a document is considered annotated with the metalabel Mn if it is annotated with at least one of the labels in Ln. Each internal node n of the hierarchy also accommodates a multilabel classifier hn. The task of hn is to predict one or more metalabels of its children. Therefore, the set of labels for hn is Mn={Mc, c family children(n)}. FIG. 8 shows a sample hierarchy produced for a multilabel classification task with six (6) labels.

For multilabel classification of a new document, the classifier starts with h{root} and then forwards it to the multilabel classifier hc of the child node c only if Mc is among the predictions of h{(c)}. The main issue in building hierarchies is to determine the way of distributing the labels of Ln among the k children. One can distribute k subsets in such a way that labels belonging to the same subset will be similar. In this example, the present method and system distributes labels Ln among children nodes by choosing the best value of k at each node according to the prediction of the hierarchy performance. Further details of the present method and system can be found with reference to FIG. 9.

Figure 9:
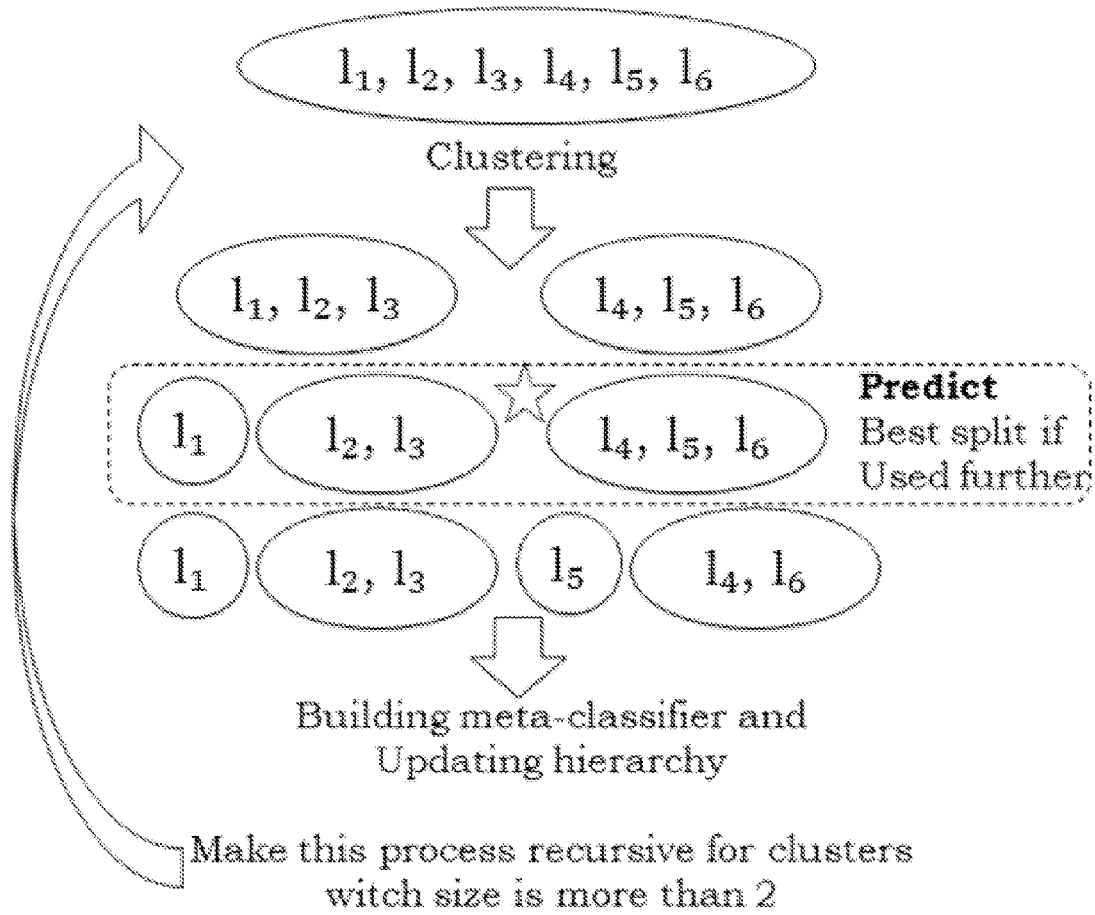

A brief description of PHOCS is as follows (see Algorithm 1 (FIGS. 8A and 8B) and FIG. 9). The present method is recursive. The method takes the following as an input: a training dataset, the minimum and maximum numbers of clusters k{min} and k{max} (line 1). The method starts from the set of all labels, makes K-means clustering of them into different numbers of clusters from k{min} to k{max} (line 4). These sets of clusters are candidates for the next layer of the hierarchy. Each cluster contains a number of labels called a metalabel (line 5), which are placed into the hierarchy and measure its classification efficiency. Thus, the efficiency measure for each set (line 6) is determined. Next, the method predicts all options of the further development of each set (line 8). The best set is chosen and put into the hierarchy according to this prediction. The recursive process is performed until clusters with single labels (line 12) are received Having done partition of the labels into a certain number of clusters, the method performs classification using these clusters. The method uses the F1-measure to measure how good the partition for classification is, particularly at a given layer. The method predicts the F1-measure for all possible hierarchy topologies using the results for the given layer and then to select the best one (line 21). The prediction for every topology depends on the F1-measure for the current layer and the number of labels still needed to be clustered. The question is in finding the best estimate of the F1-measure for the next layer of the hierarchy. It could be estimated by considering true positives, false negatives, and false positives (TP, FN, and FP), and then by computing the F1. In this example, TP decreases and FN increases deeper into a hierarchy. However, it is difficult to make any sound assumptions about FP (and true negatives as well). In this case they are difficult to predict, hence the method uses a simpler model. It is assumed that the F1-measure becomes smaller layer-by-layer (as a hierarchy is growing), that is, the F1-measure at the layer k is larger than at the layer k+1, and the relative decrease depends on the number of clusters. Finally, the method estimates it as F1{k+1}=PRODUCT{i=1}^{k}F1i (lines 24-30).

This F1{k+1} relationship can be explained as follows. If dealt with the accuracy of classification assuming the errors at different layers to be independent of each other, then the accuracy at the k+1 layer would be found by multiplying the accuracies of all the previous layers. In our case, the method uses the F1-measure, which is not exactly the measure of the accuracy of classification but, nevertheless, the F1-measure is close to the measure of accuracy. Hence, the relationship yields an approximation of the hierarchy performance. Thus, the final prediction for each partition depends both on the decrease of the F1-measure at the given layer and on the number of labels yet to be clustered, that is, on the size of the maximal cluster or, in other words, the maximal depth of the hierarchy. The final prediction can be found by multiplying the prediction for the maximal cluster and the initial results of classification over all clusters (lines 31-33). The prediction and selection of the best topology could be made on the basis of other performance measures, like precision or recall (line 17). The results for the F1 measure have been demonstrated.

In this example, the method begins with start from hn=h{root}. Using hierarchical clustering, a hierarchy of labels has been built. Then using this hierarchy, Ln has been divided in any number of clusters. Using a flat multi-label classifier, a minimum value of F-measure F{min} for a training set has been derived. Then, the method divides Ln in I|L_n|−1 clusters, and thus the method, for each time, derives a hierarchy with two (2) layers. The method classifies each hierarchy and finds the best partition. If the best result is worse than Fmin, the method stops and outputs that the flat result is the best for this node. The method selects the best partition. The method is recursive for child metalabels of hn. Of course, there can be other variations.

In this example, experiments are performed on four (4) multilabel datasets available at http://mlkd.csd.auth.gr/multilabel.html. FIG. 10 (Table I) presents basic statistics, such as the number of the examples and labels, along with the statistics that are relevant to the labelsets, such as upper bound of labelset, actual number, and diversity.

These datasets are divided into the train and test parts in the proportion 2 to 1, respectively. The decision tree algorithm C4.5 is chosen to be the basic multilabel classifier. For clustering and building hierarchies, the K-means algorithm is used. The micro and macro measures of classification accuracy (precision (P), recall (R) and F1-measure) are used in the same way. The parameter values for the PHOCS are chosen as $k_{min}$=2 and $k_{max}$=10. Such $k_{max}$ is chosen since the number of labels in our experiments has the order of 100, so the hierarchy contains at least two (2) layers. Our method was restricted to work on the first two layers, subsequent layers were created using flat clustering with maximum number of clusters $k_{max}$=10. The technique builds three hierarchies for each dataset: the hierarchies extracted with the accuracy and the micro F1-measure are similar and are marked as H1, whereas the H2-hierarchies correspond to the macro F1-measure.

In the scope of PHOCS, there are only the datasets having no predefined hierarchies, thus the flat classification case is taken as the baseline. The obtained results for the flat and generated hierarchies are shown in FIGS. 11-14 (Tables II-V). The significantly best values of the F1-measures are boldfaced. We were more interested in the results at the leaf nodes (labels), since the other labels are the metalabels not being present in the initial "flat" hierarchy.

In this example referring to FIGS. 11 and 12, the present method and system can achieve higher F measures. Such higher F measures are desirable and have been demonstrated as referenced to the flat hierarchy. As shown, the present method and system achieves 20% or up to about 100% higher F measures. The results for all the labels include the results at the intermediate metalabels. These results are represented only for micro measures, since in this case metalabels have a great impact, as a large number of documents pass them. In case of macro measures metalabels are less important, since their number is significantly smaller than that of leaf labels.

Next, the technique compares and analyzes the results at the leaf labels. One can see in Tables II-V that with all datasets except the Mediamill the F1 measure of the extracted hierarchies outperforms the F1 measure of the flat one. It has been observed that the precision of classification slightly falls while the recall increases compared to the flat classification. This improves the F1-measure almost in all cases.

On average, in two cases out of four, the results are the same for the both measures used for prediction. Slight differences are observed on Bibtex and Enron datasets. These results show that sometimes, the technique can adjust measures by extracting different hierarchies.

As shown, the method and system provides for automatic extraction of hierarchies for classification, called the PHOCS. This method is based on flat clusterings of multilabels, and it is classifier independent. Thus, it has an advantage of enhancing the accuracy of multilabel classification by optimizing a hierarchy structure, not classifiers. The PHOCS is applicable for the datasets without predefined hierarchies. The experimental study of the PHOCS performance on four (4) multilabel datasets proves its effectiveness. Implementation of the corresponding toolkit is made on the basis of the WEKA ML tools.

It should be understood that the description recited above is an example of the disclosure and that modifications and changes to the examples may be undertaken which are within the scope of the claimed disclosure. Also as used herein, the terms "first," "second," "third," and other like terms do not necessarily imply order, and should be interpreted without such undue limitations. Therefore, the scope of the appended claims should be accorded the broadest interpretation so as to encompass all such modifications and similar arrangements, including a full scope of equivalents.

The invention claimed is:

1. A method for processing information, the method comprising:
    providing a plurality of documents under control of a processing device, each of the plurality of documents having a label;
    processing the labels related to the plurality of documents, using a clustering process, to cluster the labels into a plurality of clusterings representing a plurality of classes;
    classifying the documents using the clusterings representing the plurality of classes;
    predicting a plurality of performance characteristics, respectively, for the plurality of clusterings;
    wherein the predicting the plurality of performance characteristics provides a performance measure to predict how accurate the clustering for classification at a given layer of a hierarchy;
    selecting at least one of the clusterings using information from the performance characteristics; and
    adding the selected clustering into the hierarchy.

2. The method of claim 1 wherein the labels are a current set of labels, the current set of labels are all of the labels associated with the plurality of documents;
    wherein the hierarchy includes a current node;
    wherein the clustering process comprises a k-means algorithm to cluster labels, the k-means algorithm being provided for each integer value of clusters; and
    further comprising:
    inputting through a user interface an integer value representing a number of clusters into the clustering process under control of the processing device, the integer value ranging from two (2) to a maximum number, whereupon the maximum number is an integer greater than two (2).

3. The method of claim 2 wherein the current node is the root node for a first step and not the root node for other steps; wherein the plurality of documents are stored in electronic form in at least one mass data storage device, the mass data storage device being coupled to a computing device, the computing device having a computer readable memory.

4. The method of claim 1 wherein each of the clusterings is defined as a single class; wherein the classifying comprises providing each of the documents in one or more classifications.

5. The method of claim 1 further comprising determining a hierarchy performance characteristic of the hierarchy.

6. The method of claim 1 further comprising selecting one of the clusterings having a larger performance characteristic.

7. The method of claim 1 wherein for each of the clusterings constructing a metalabel; and adding a child node to the hierarchy, the child node being associated with the metalabel.

8. The method of claim 7 wherein for each of the clusterings with a single label further comprising no meta-label is constructed.

9. The method of claim 1 further comprising iteratively repeating the processing, classifying, predicting, selecting, and adding until a condition is achieved; wherein the iteratively repeating is recursive from a preceding step; wherein the condition is achieved when each clustering consists of a single label.

10. The method of claim 1 further comprising outputting an F1 measure for the hierarchy.

11. A system for processing information, the system comprising:
    a computing device;
    a data storage device comprising a plurality of documents, each of the plurality of documents comprising a label, the plurality of documents being stored in electronic form, the data storage device being coupled to the computing device;
    a first computer code directed to processing the labels related to the plurality of documents, using a clustering process, to cluster the labels into plurality of clusterings representing a plurality of classes;
    a second computer code directed to classifying the documents;
    a third computer code directed to predicting a plurality of performance characteristics, respectively, for the plurality of clusterings;
    wherein the predicting the plurality of performance characteristics provides a performance measure to predict how accurate the clustering for classification at a given layer of a hierarchy;
    a fourth computer code directed to selecting at least one of the clusterings using information from the performance characteristics;
    a fifth computer code directed to adding the selected clustering into the hierarchy.

12. The system of claim 11 wherein the labels are the current set of labels, the current set of labels are all of the labels associated with the plurality of documents;

wherein the hierarchy includes a current node; wherein the clustering process comprises a k-means algorithm to cluster labels, the k-means algorithm being provided for each integer value of clusters; and further comprising a user interface configured for inputting through the user interface an integer value representing a number of clusters into a clustering process under control of the processing device, the integer value ranging from two (2) to a maximum number, whereupon the maximum number is an integer greater than a minimum number.

13. The system of claim 12 wherein the current node is the root node for a first step and not the root node for other steps.

14. The system of claim 11 wherein each of the clusterings is defined as a single class; and further comprising a code directed to selecting one of the clusterings having a highest performance characteristic.

15. A computer application, the computer application being stored on a computer readable memory device, the computer readable memory device comprising:

a first computer code directed to processing a plurality of labels related to a plurality of documents, using a clustering process, to cluster the labels into a plurality of clusterings representing a plurality of classes;

a second computer code directed to classifying the documents;

a third computer code directed to predicting a plurality of performance characteristics, respectively, for the plurality of clusterings;

wherein the predicting the plurality of performance characteristics provides a performance measure to predict how accurate the clustering for classification at a given layer of a resulting hierarchy;

a fourth computer code directed to selecting at least one of the clusterings using information from the performance characteristics;

a fifth computer code directed to adding the selected clustering into the resulting hierarchy.

* * * * *